United States Patent

Kaply et al.

[11] Patent Number: 5,841,420
[45] Date of Patent: Nov. 24, 1998

[54] METHOD AND SYSTEM IN A DATA PROCESSING SYSTEM WINDOWING ENVIRONMENT FOR DISPLAYING PREVIOUSLY OBSCURED INFORMATION

[75] Inventors: Michael Aaron Kaply, Delray Beach; Antony Edward Martinez, Boca Raton, both of Fla.

[73] Assignee: International Business Machines Corporation, Armonk, N.Y.

[21] Appl. No.: 516,663

[22] Filed: Aug. 18, 1995

[51] Int. Cl.[6] ........................................... G09G 5/00
[52] U.S. Cl. .......................... 345/118; 345/340; 345/344
[58] Field of Search .................... 345/118, 119, 345/120, 127, 340, 344

[56] References Cited

U.S. PATENT DOCUMENTS

| | | | |
|---|---|---|---|
| 4,078,249 | 3/1978 | Lelke et al. .............................. | 364/200 |
| 4,412,296 | 10/1983 | Taylor ..................................... | 364/521 |
| 4,710,767 | 12/1987 | Sciacero et al. ......................... | 340/799 |
| 4,723,211 | 2/1988 | Barker et al. ............................ | 364/300 |
| 4,736,309 | 4/1988 | Johnson et al. ......................... | 364/521 |
| 4,744,046 | 5/1988 | Foster ..................................... | 364/900 |
| 4,829,470 | 5/1989 | Wang ..................................... | 364/900 |
| 5,001,697 | 3/1991 | Torres ..................................... | 364/521 |
| 5,027,110 | 6/1991 | Chang et al. ............................ | 340/731 |
| 5,175,813 | 12/1992 | Golding et al. ......................... | 395/157 |
| 5,208,906 | 5/1993 | Morgan ................................... | 395/148 |
| 5,214,755 | 5/1993 | Mason ..................................... | 395/147 |
| 5,237,653 | 8/1993 | Noguchi et al. ......................... | 345/120 |
| 5,334,994 | 8/1994 | Tagaki ..................................... | 345/120 |
| 5,388,202 | 2/1995 | Squires et al. ........................... | 395/157 |
| 5,487,143 | 1/1996 | Southgate ................................ | 395/155 |
| 5,515,494 | 5/1996 | Lentz ..................................... | 395/157 |
| 5,534,887 | 7/1996 | Bates et al. .............................. | 345/120 |
| 5,542,069 | 7/1996 | Meppelink et al. ..................... | 345/119 |
| 5,557,298 | 9/1996 | Yang et al. .............................. | 345/119 |

FOREIGN PATENT DOCUMENTS

0605945A1   7/1994   European Pat. Off. .

OTHER PUBLICATIONS

Third ACM Conference on Hypertext, Proceedings of Hypertext '91, Dec. 15–18, 1991, San Antonio, TX, "Screen Management in Hypertext Systems with Rubber Sheet Layouts", Kaltenbach et al, pp. 91–105.

*Primary Examiner*—Richard A. Hjerpe
*Assistant Examiner*—Ricardo Osorio
*Attorney, Agent, or Firm*—Mark S. Walker; Andrew J. Dillon

[57] ABSTRACT

In a data processing system having a display and an operating system, information is displayed within a first window utilizing information display software. Thereafter, the process detects a second window displayed within the display at a location that obscures a portion of the information displayed in the first window. Utilizing the operating system, the process notifies the information display software that the portion of the information within the first window is obscured by the second window. In response to receiving this information, the information display software displays, in the first window, the portion of the information that had been obscured by the second window, wherein the information in the first window previously obscured by the second window may be viewed in the first window by the data processing system user. Information displayed in the first window may be textual or graphical. The information display software may also receive information form the system that specifies coordinates of available display area. In response to predetermined conditions, previously obscured information may be displayed in available display area in a relocated first windows.

9 Claims, 11 Drawing Sheets

METHOD AND SYSTEM IN A DATA PROCESSING SYSTEM WINDOWING ENVIRONMENT FOR DISPLAYING PREVIOUSLY OBSCURED INFORMATION

BACKGROUND OF THE INVENTION

1. Technical Field

The present invention relates in general to an improved data processing system, and in particular to a method and system for displaying information in a data processing system. More particularly, the present invention relates to a method and system for displaying information in windows in a graphical user interface.

2. Description of the Related Art

A graphical user interface (GUI) is a type of display format that enables a data processing system user to choose commands, start programs, and see graphical and textual information generated by applications by pointing to pictorial representations (icons) and lists of menu items on the screen. Examples of such graphical user interfaces include the graphical user interface sold under the trademark "WINDOWS" by Microsoft Corporation and the graphical user interface sold under the trademark "OS/2 Warp" by International Business Machines Corporation (IBM).

For application developers, graphical user interfaces offer a programming environment that manages the direct interaction between the computer and computer user. This permits the developer to concentrate on application programming without devoting a large percentage of effort to the details of screen display or mouse and keyboard inputs. A GUI also enables programmers to create programs that handle frequently preformed tasks, such as displaying textual or graphical information in a window, in the same way because the interface provides standard controlling mechanisms such as the generation of windows and dialog boxes. Another benefit is that applications written for a graphical user interface are device-independent— as the interface changes to support new input or output devices, such as a large-screen monitor, the applications can, without modification, use such new devices.

It is well known to use "windows" in implementing a graphical user interface. A window is a portion of the screen that can contain its own document or message. Windows may be used to display various types of information and other objects, such as textual information, graphical information, and application tools such as icons, buttons, status windows, and the like. Different windows may receive output from different applications running concurrently, and a single application may generate output displayed in several windows. Each window might also contain its own menu or other controls, and the computer user might be able to enlarge and shrink individual windows at will. Typically, windows act independently, as if each window were a virtual display device.

In general, windows may be displayed as tiled, or overlapped. Tiled windows are displayed side-by-side horizontally or vertically or both, with no overlap of their displayed regions. Overlapped windows appear to be stacked one on top of another, like individual pieces of paper piled on a desktop, with the covered portions of lower windows not being displayed. This type of display is sometimes referred to as "the desktop metaphor for displays," or "messy desk windowing." It is currently popular in data processing systems to support such messy desk windowing.

Referring to FIG. 1A, a typical window is shown containing textual information. Although it may not be apparent in FIG. 1A, the textual information shown in window 12 is displayed utilizing a technique called "wordwrapping." Such wordwrapping allows a program that displays textual information to break lines of text automatically to fill the display space in the window in response to the current size of that window. Line breaks created by wordwrapping may be known as soft returns. Thus, as the window display area is made larger by resizing the window, lines in a paragraph of textual information are configured to extend from the left boundary to the right boundary of the window, and soft returns are placed in the textual information as necessary for the text to fill the window starting from left to right and top to bottom.

As illustrated in FIG. 1A, data processing system help files are frequently displayed in a window that allows for wordwrapping. Other examples of systems that allow for wordwrapping include the OS/2 help system, the OS/2 system editor, and the program sold under the trademark "AmiPro" by Lotus.

As illustrated in FIG. 1B, a user may from time-to-time wish to open a help file in window 12 to obtain information about manipulating controls or other information in a second window 14. Many times such a second window 14 will overlap the help window 12 and obscure information the user wants to see. To continue to manipulate information in the second window 14 while using information in the help window 12, the user would have to click on the help window 12 to make it the active window, then resize the help window 12 or move it to a position where the desired information is not overlapped by the second window 14. This is an annoying set of steps for desktop management that wastes the computer user's time.

SUMMARY OF THE INVENTION

It is therefore one object of the present invention to provide an improved data processing system.

It is another object of the present invention to provide a method and system for displaying information in a data processing system.

It is yet another object of the present invention to provide a method and system for displaying information in windows in a graphical user interface.

The foregoing objects are achieved as is now described. In a data processing system having a display and an operating system, information is displayed within a first window utilizing information display software. Thereafter, the process detects a second window displayed within the display at a location that obscures a portion of the information displayed in the first window. Utilizing the operating system, the process notifies the information display software that the portion of the information within the first window is obscured by the second window. In response to receiving this information, the information display software displays, in the first window, the portion of the information that had been obscured by the second window, wherein the information in the first window previously obscured by the second window may be viewed in the first window by the data processing system user. Information displayed in the first window may be textual or graphical. The information display software may also receive information from the system that specifies coordinates of available display area. In response to predetermined conditions, previously obscured information may be displayed in available display area in a relocated first window.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 2:
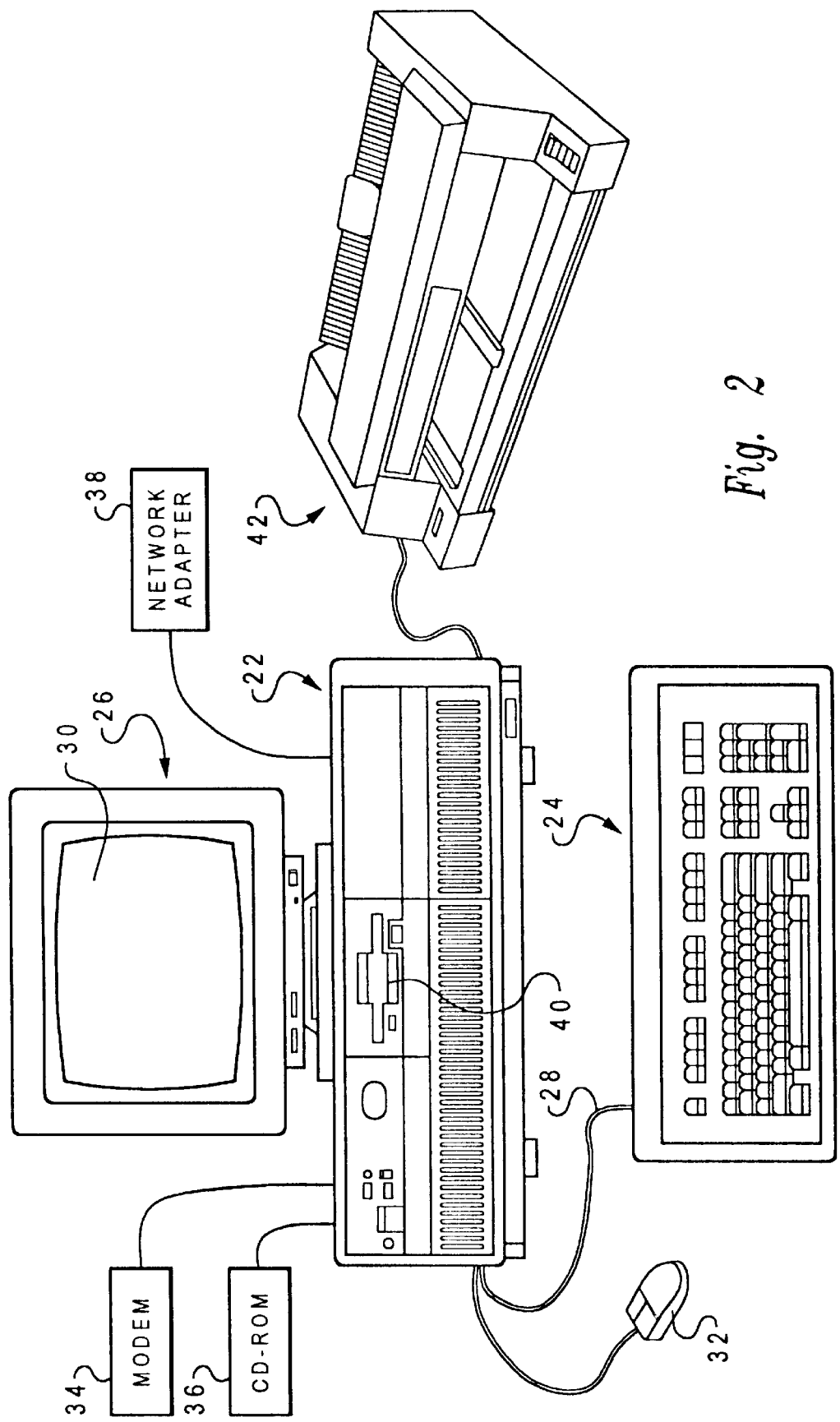
FIG. 2 depicts a data processing system in accordance with the method and system of the present invention.

With reference now to the figures, and in particular to FIG. 2, there is depicted a data processing system 20, which includes processor 22, keyboard 24, and display 26. Keyboard 24 is coupled to processor 22 by a cable 28. Display 26 includes display screen 30, which may be implemented utilizing a cathode ray tube (CRT), a liquid crystal display (LCD), an electroluminescent panel, or the like. Data processing system 20 also includes pointing device 32, which may be implemented utilizing a track ball, joystick, touch sensitive tablet or screen, trackpad, or as illustrated in FIG. 2, a mouse. Pointing device 32 may be utilized to move a pointer or cursor on display screen 30. Processor 22 may also be coupled to one or more peripheral devices, such as modem 34, CD-ROM 36, network adaptor 38 and floppy disk drive 40, each of which may be internal or external to the enclosure of processor 22. An output device such as printer 42 may also be coupled to processor 22.

Those persons skilled in the art of data processing systems design should recognize that display 26, keyboard 24, and pointing device 32 may each be implemented utilizing any one of several known off-the-shelf components. Data processing system 20 may be implemented utilizing any general purpose computer or so-called personal computer, such as the personal computer sold under the trademark "PS/2," which is manufactured and distributed by International Business Machines Corporation (IBM), of Armonk, N.Y.

Figure 3:
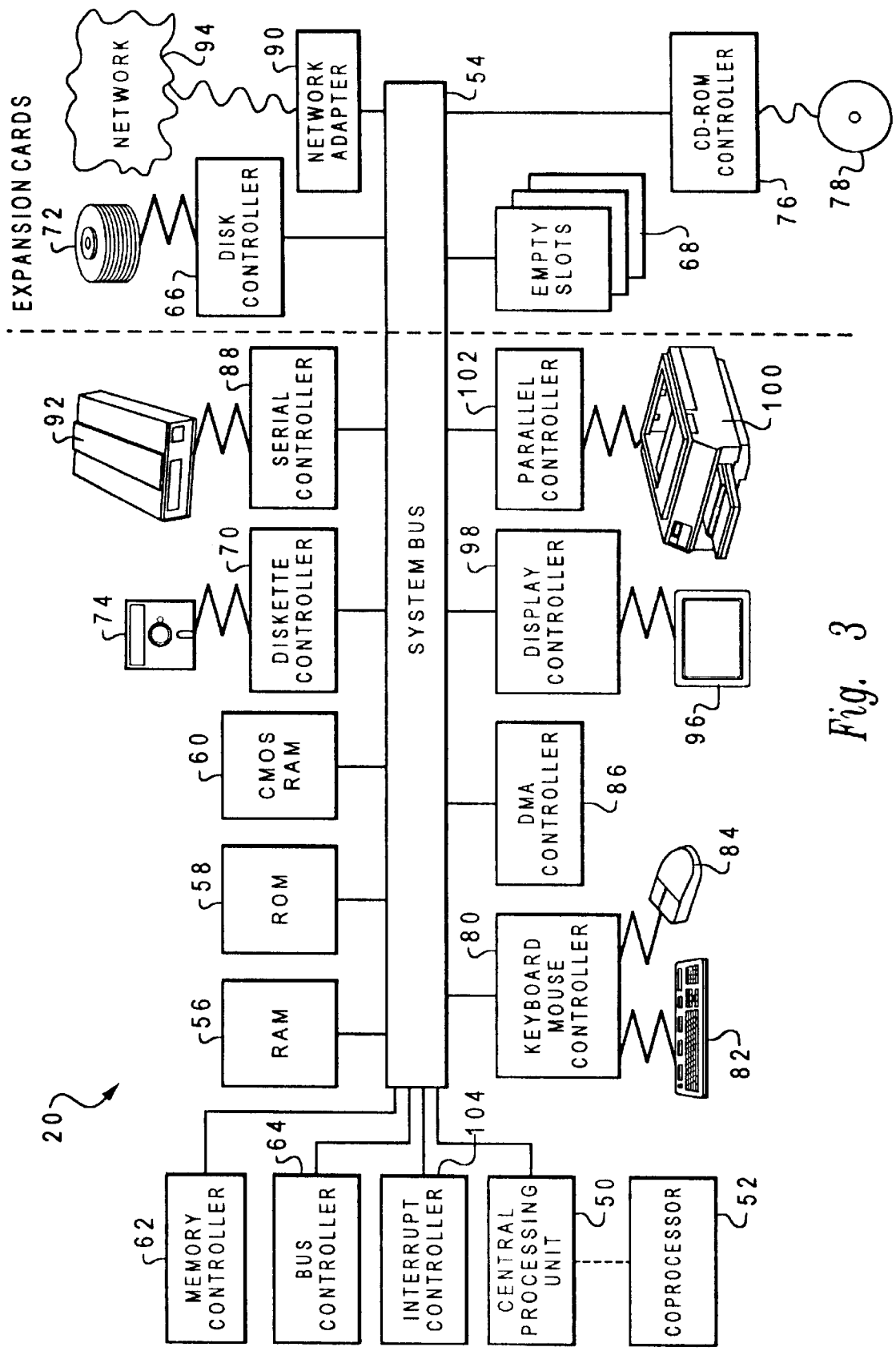
FIG. 3 is a more detailed high-level block diagram which further illustrates the major components of the data processing system of FIG. 2.

With reference now to FIG. 3, there is depicted a high-level block diagram which further illustrates the major components that may be included in data processing system 20 of FIG. 2. Data processing system 20 is controlled primarily by computer readable instructions, which may be in the form of software, wherever, or by whatever means such software is stored or accessed. Such software may be executed within central processing unit (CPU) 50 to cause data processing system 20 to do work. In many known workstations and personal computers, such as the personal computer sold by IBM under the trademark "PS/2," central processing unit 50 is implemented by a single-chip CPU called a microprocessor. Examples of such microprocessors include the microprocessor sold under the trademark "PENTIUM" by Intel Corporation and the microprocessor sold under the trademark "PowerPC" by International Business Machines Corporation.

Coprocessor 52 is an optional processor, distinct from main CPU 50, that performs additional functions or assists CPU 50. One common type of coprocessor is the floating-point coprocessor, also called a numeric or math coprocessor, which is designed to perform numeric calculations faster and better than general-purpose CPU 50. Recently, however, the functions of many coprocessors have been incorporated into more powerful single-chip microprocessors.

CPU 50 fetches, decodes, and executes instructions, and transfers information to and from other resources via the computer's main data-transfer path, system bus 54. Such a system bus connects the components in data processing system 20 and defines the medium for data exchange. System bus 54 typically includes data lines for sending data, address lines for sending addresses, and control lines for sending interrupts and for operating the system bus. An example of such a system bus is the PCI (Peripheral Component Interconnect) bus and the bus sold under the trademark "Micro Channel Architecture" by IBM. The Micro Channel Architecture provides a function called bus arbitration that regulates access to the bus by extension cards, controllers, and CPU 50. Devices that attach to the Micro Channel and arbitrate to take over the bus are called bus masters. Bus master support also allows multiprocessor configurations of the Micro Channel to be created by the addition of bus master adapters containing a processor and its support chips.

Memory devices coupled to system bus 54 include random access memory (RAM) 56, read only memory (ROM) 58, and nonvolatile memory 60. Such memories include circuitry that allows information to be stored and retrieved. ROMs contain stored data that cannot be modified. Data stored in RAM can be read or changed by CPU 50 or other hardware devices. Nonvolatile memory is memory that does not lose data when power is removed from it. Nonvolatile memories include ROM, EPROM, flash memory, bubble memory, or battery-backed CMOS RAM. As shown in FIG. 3, such battery-backed CMOS RAM may be utilized to store system configuration information.

Access to RAM 56, ROM 58, and nonvolatile memory 60 may be controlled by memory controller 62 and bus controller 64. Memory controller 62 may provide an address translation function that translates virtual addresses into physical addresses as instructions are executed. Memory controller 62 may also provide a memory protection function that isolates processes within the system and isolates system processes from user processes. Thus, a program running in user mode can access only memory mapped by its own process virtual address space; it cannot access memory within another process's virtual address space unless memory sharing between the processes has been set up.

An expansion card or expansion board is a circuit board that includes chips and other electronic components connected in a circuit that adds functions or resources to the computer. Typical expansion cards add memory, disk-drive controllers 66, video support, parallel and serial ports, and internal modems. For laptop, palmtop, and other portable computers, expansion cards usually take the form of PC Cards, which are credit card-size devices designed to plug into a slot in the side or back of a computer. An example of such a slot is the PCMCIA slot (Personal Computer Memory Card International Association) which defines type I, II and III card slots. Thus, empty slots 68 may be used to receive various types of expansion cards or PCMCIA cards.

Disk controller 66 and diskette controller 70 both include special-purpose integrated circuits and associated circuitry that direct and control reading from and writing to a hard disk drive 72 and a floppy disk or diskette 74, respectively. Such disk controllers handle tasks such as positioning read/write head, mediating between the drive and the microprocessor, and controlling the transfer of information to and from memory. A single disk controller may be able to control more that one disk drive.

CD-ROM controller 76 may be included in data processing 20 for reading data from CD-ROMs 78 (compact disk read-only memory). Such CD-ROMs use laser optics rather than magnetic means for reading data.

Keyboard mouse controller 80 is provided in data processing system 20 for interfacing with keyboard 82 and a pointing device, such as mouse 84. Such pointing devices are typically utilized to control an on-screen element, such as a cursor, which may take the form of an arrow having a hot spot that specifies the location of the pointer when the user presses a mouse button. Other pointing devices include the graphics tablet, the stylus, the light pen, the joystick, the puck, the trackball, the trackpad and the pointing device sold under the trademark "TrackPoint" by IBM.

Direct memory access (DMA) controller 86 may be used to provide a memory access that does not involve CPU 50. Such memory accesses are typically employed for data transfer directly between memory and an "intelligent" peripheral device, such as between memory 56 and disk controller 66.

Communication between data processing system 20 and other data processing systems may be facilitated by serial controller 88 and network adaptor 90, both of which are coupled to system bus 54. Serial controller 88 is utilized to transmit information between computers, or between a computer and peripheral devices, one bit at a time over a single line. Serial communications can be synchronous (controlled by some time standard such as a clock) or asynchronous (managed by the exchange of control signals that govern the flow of information). Examples of serial communications standards include the RS-232 interface and the RS-422 interface.

As illustrated, such a serial interface may be utilized to communicate with modem 92. A modem is a communications device that enables a computer to transmit information over a standard telephone line. Modems convert digital computer signals to analog signals suitable for communication over telephone lines. Modem 92 may be utilized to connect data processing system 20 to an on-line information service, such as the information service provided under the service mark "PRODIGY" by IBM and Sears. Such on-line service providers may offer software which may be downloaded into data processing system 20 via modem 92. Modem 92 may provide a connection to other sources of software, such as a server, an electronic bulletin board, and the Internet or World Wide Web.

Network adaptor 90 may be used to connect data processing system 20 to a local area network 94. Network 94 may provide computer users with means of communicating and transferring software and information electronically. Additionally, network 94 may provide distributed processing, which involves several computers and the sharing of workloads or cooperative efforts in performing a task.

Display 96, which is controlled by display controller 98, is used to display visual output generated by data processing system 20. Such visual output may include text, graphics, animated graphics, and video. Display 96 may be implemented with a CRT-based video display, an LCD-based flat-panel display, or a gas plasma-based flat-panel display. Display controller 98 includes electronic components required to generate a video signal that is sent to display 96.

Printer 100 may be coupled to data processing system 20 via parallel controller 102. Printer 100 is used to put text or a computer-generated image on paper or on another medium, such as a transparency. Other types of printers may include an imagesetter, a plotter, or a film recorder.

Parallel controller 102 is used to send multiple data and control bits simultaneously over wires connected between system bus 54 and another parallel communication device, such as printer 100. The most common parallel interface is the Centronics interface.

During data processing operations, the various devices connected to system bus 54 may generate interrupts which are processed by interrupt controller 104. An interrupt is a request for attention from CPU 50 that can be passed to CPU 50 by either hardware or software. An interrupt causes the microprocessor to suspend currently executing instructions, save the status of the work in progress, and transfer control to a special routine, known as an interrupt handler, that causes a particular set of instructions to be carried out. Interrupt controller 104 may be required to handle a hierarchy of interrupt priorities and arbitrate simultaneous interrupt requests. Interrupt controller 104 may also be used to temporally disable interrupts.

Figure 4:
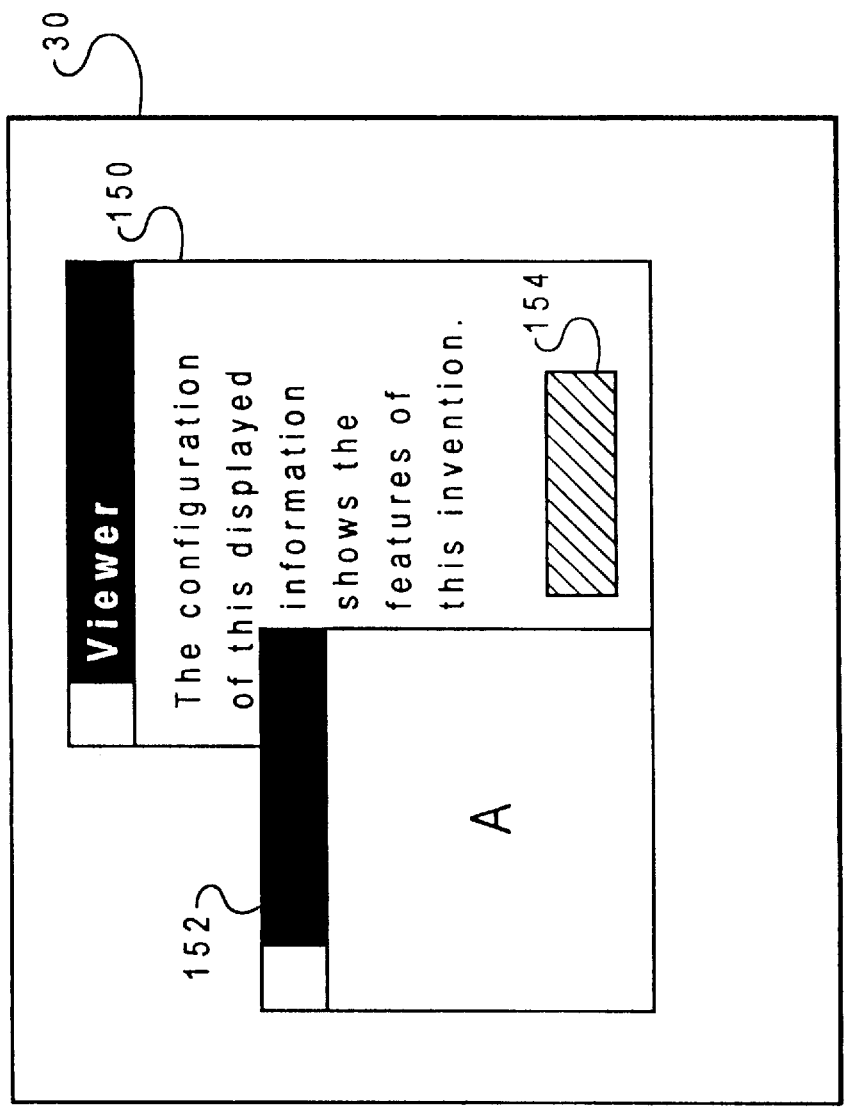
FIG. 4 illustrates a display containing a window that displays information in accordance with the method and system of the present invention.

With reference now to FIG. 4, there is depicted a display containing a window that displays information in accordance with the method and system of the present invention. As illustrated, display screen 30 includes window 150 and window 152. Window 150 displays information under the control of information display software, which may include, for example, a text editor or word processing program, or software that displays help files. In the example shown in FIG. 4, the information is textual information and graphical information, wherein graphic 154 is positioned below the textual information in window 150.

Figure 1A:
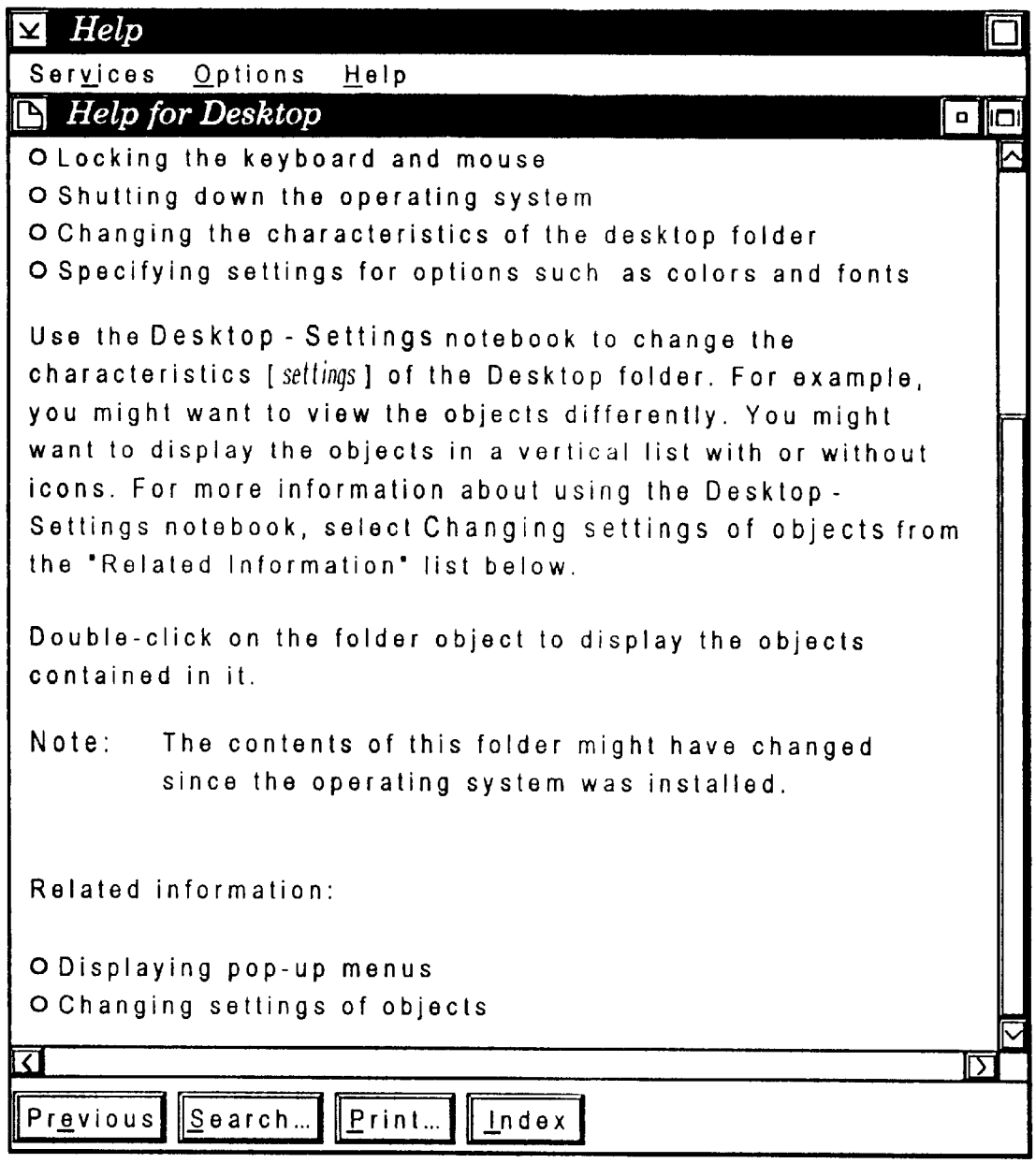
FIG. 1A depicts a typical window in a graphical user interface according to the prior art.
Figure 1B:
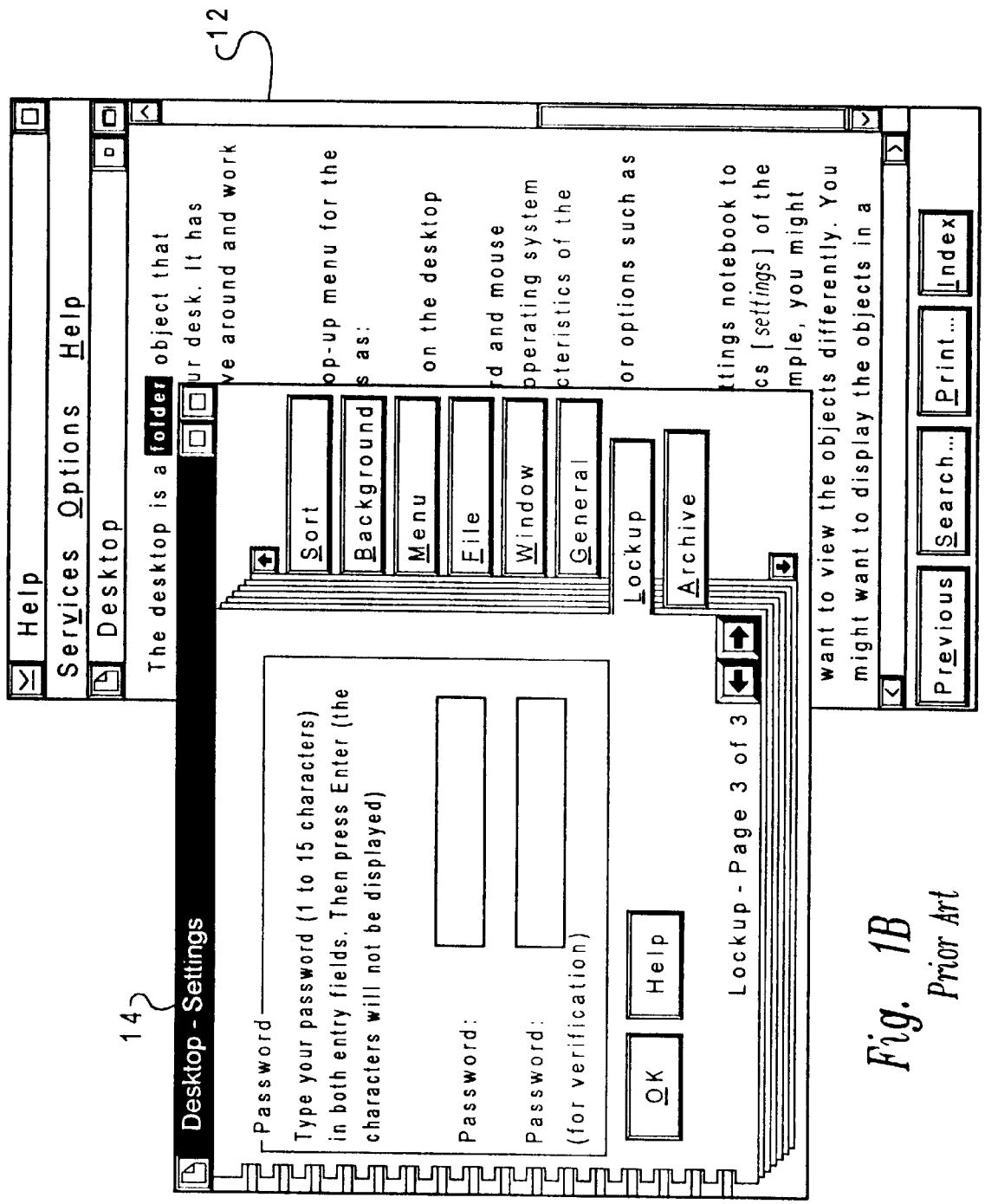
FIG. 1B shows a first window and a second window that overlays the first window according to the prior art.

According to an important aspect of the present invention, window 152 is displayed at a location within display screen 30 that obscures a portion of window 150. FIG. 4 illustrates that information in window 150 may be displayed according to the method and system of the present invention so that it is useful to a data processing system user, and not obscured by window 152. In the absence of the method and system of the present invention, a portion of the information displayed in window 150 would be obscured by window 152, in a manner similar that illustrated in FIG. 1B. In accordance with the present invention, textual information and graphical information that had been obscured by window 152 has been moved within window 150 to a location within window 150 that is not obscured by window 152. If window 150 includes textual information, the words are relocated, maintaining their predetermined order, as if the right or left margins were reset to permit the text to wrap around an area obscured by window 152.

Figure 5:
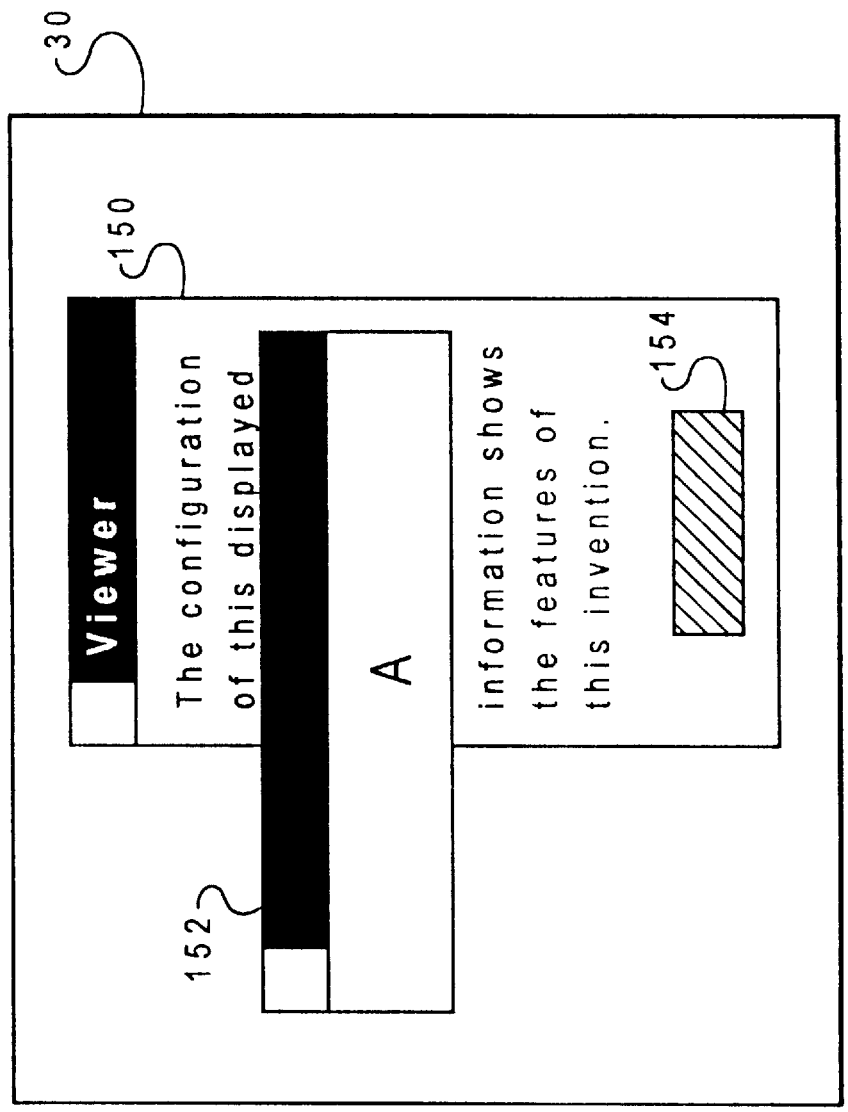
FIG. 5 depicts the reconfiguration of information within the window shown in FIG. 4 after an overlaying window has been resized, in accordance with the method and system of the present invention.

With reference now to FIG. 5, there is depicted a display containing a window that displays information according to the method and system of the present invention in a second case. As illustrated, window 150 within display 30 contains textual and graphical information. The graphical information takes the form of graphic 154. Window 152 has been displayed in a location that extends almost entirely across window 150, leaving a portion of window 150 along the right side that is too narrow to display textual or graphical information. In this case, textual information that starts above window 152 has been moved from a location obscured by window 152 to a location immediately below window 152—a location that is not obscured by window 152. Therefore, after window 152 has been resized from the size shown in FIG. 4, window 150 continues to make information within window 150 visible to the data processing user.

Figure 6:
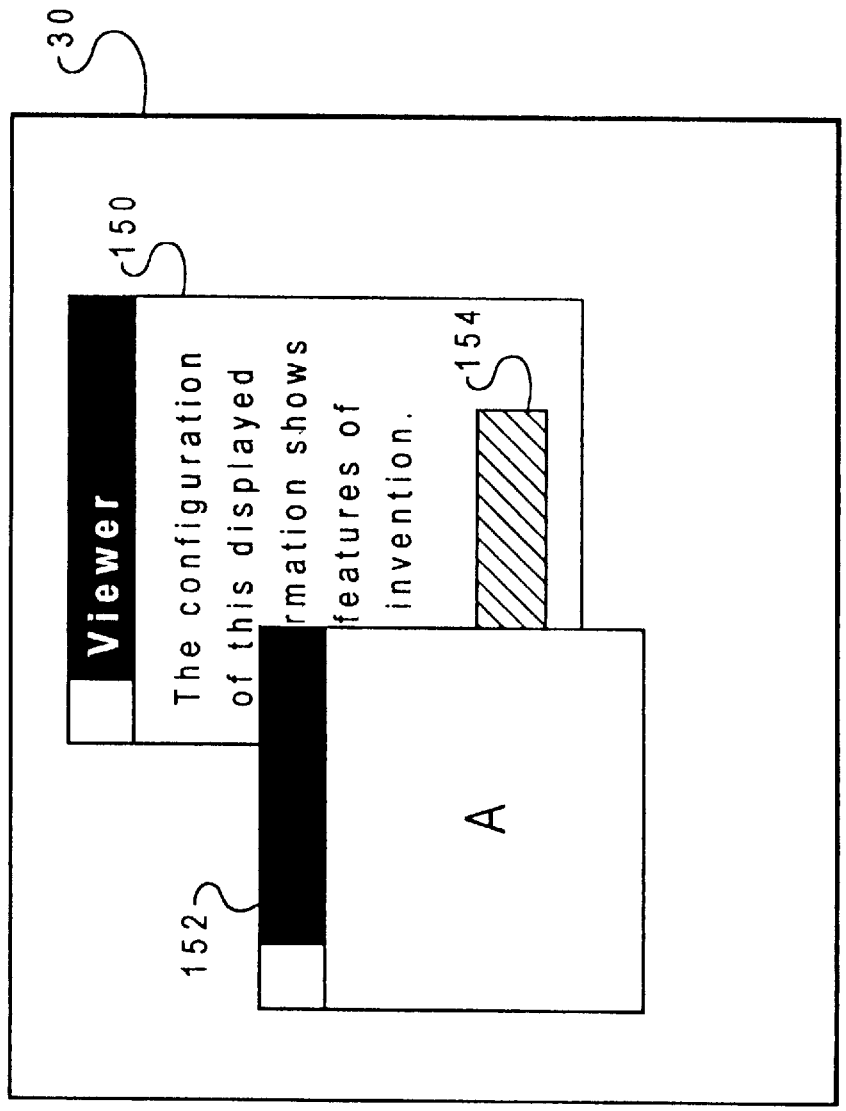
FIG. 6 illustrates a window for displaying information with the display feature of the present invention disabled.

With reference now to FIG. 6, there is depicted a display that includes a window for displaying information, wherein the method and system for displaying information has been disabled in accordance with one embodiment of the present invention. As illustrated, display 30 includes windows 150 and 152. Window 150 is utilized to display information, in the form of textual information and graphical information 154. Window 152 has been displayed in a location such that a portion of the information in window 150 has been obscured by window 152. Because the method and system for displaying information has been disabled in the example shown in FIG. 6, the textual and graphical information 154 in window 150 has been partially obscured by window 152.

Means for enabling and disabling the display function of the present invention may be accomplished at either the system level or in the information display software. At the system level, when the display is disabled, the system may stop notifying, or sending messages to, the information display software, which would then prevent the information display from reconfiguring information in a window that has been overlapped. If the enable/disable function is handled in the information display software, the information display software may simply ignore a message from the system that indicates a portion of information displayed in a window under the control of the information display software has been obscured.

Figure 7:
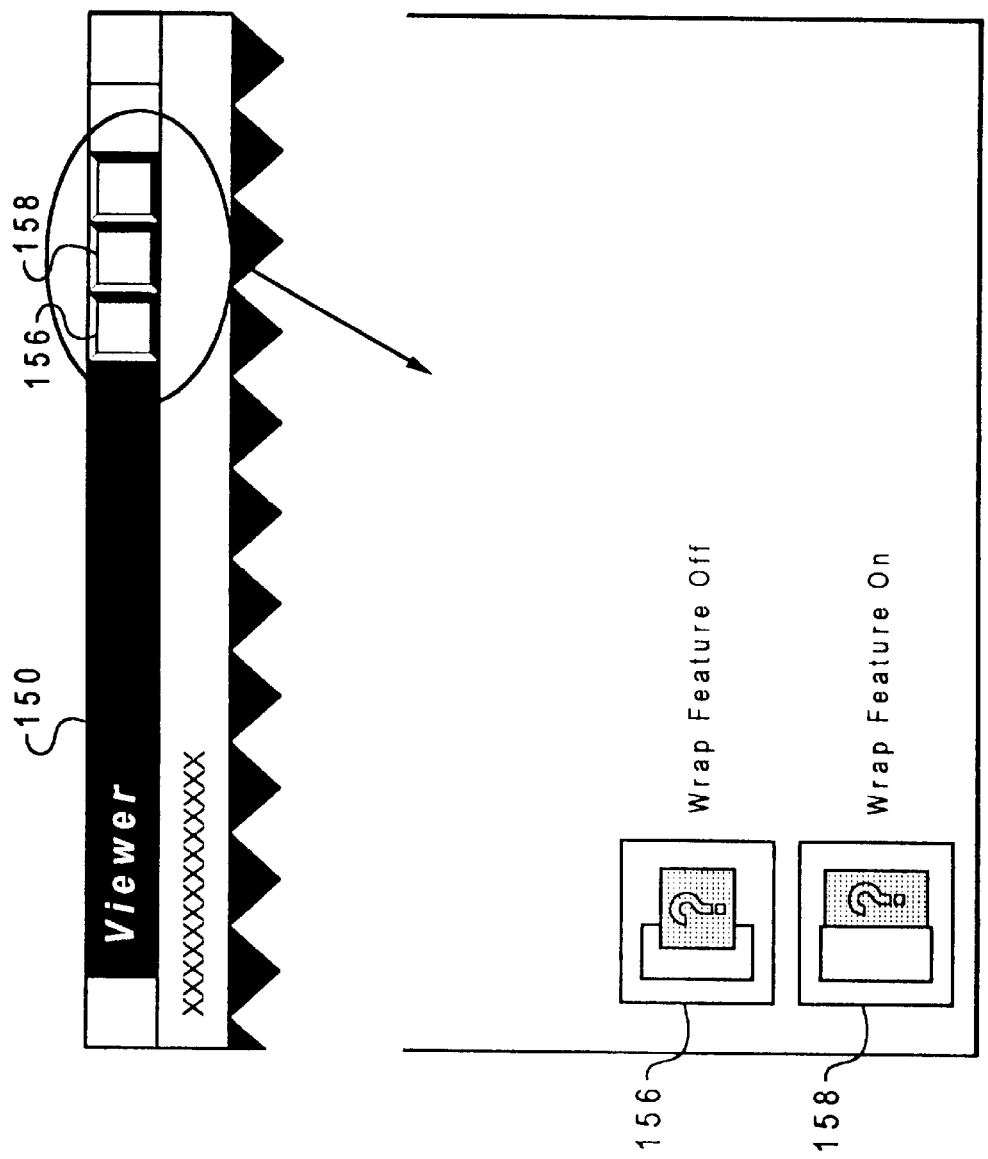
FIG. 7 depicts a title bar having means for enabling and disabling the display function of the present invention.

With reference now to FIG. 7, there is depicted a title bar having means for enabling and disabling the display function of the present invention. As illustrated in the embodiment shown in FIG. 7, selected areas in the menu bar of window 150 are used to permit selection of various features or modes of operation of window 150. As illustrated, the means for receiving user input to enable and disable the display feature of the present invention is implemented with a button, such as buttons 156 and 158. By selecting button 156, the display feature of the present invention is disabled and any window 152 that overlays window 150 containing button 156 may obscure information displayed in window 150 that is below overlaying window 152. If the user clicks on button 158, the display feature of the present invention is enabled, and any window 152 positioned to obscure information in window 150 will cause window 150 to reconfigure the information contained therein so that an overlaying window 152 does not obscure information. Although the embodiment illustrated in FIG. 7 utilizes buttons in a title bar to enable and disable the display function of the present invention, other controls associated with specific windows may be utilized to enable and disable the function on a window-by-window basis. For example, in another embodiment, a pull-down menu may be used to enable and disable the display function of the present invention.

Figure 8:
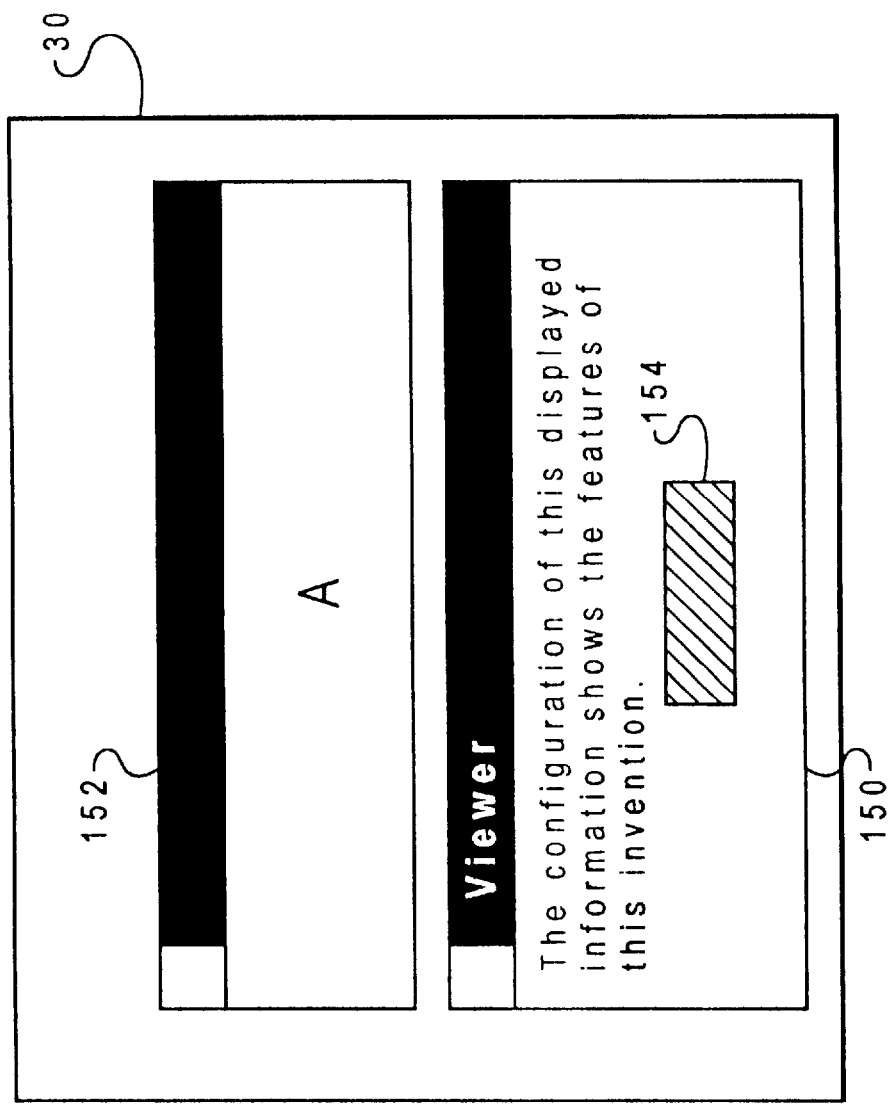
FIG. 8 illustrates a window tiling feature in accordance with the method and system of the present invention.

With reference now to FIG. 8, there is depicted a window tiling feature in accordance with the method and system of the present invention. As illustrated, display 30 includes windows 150 and 152. Window 150 has been moved to a location within display 30 that is not occupied by window 152. Window 150 has been moved to such a location in response two events: (1) detecting that window 152 is displayed in a location that obscures a portion of information displayed in window 150 when window 150 was in an original position, and (2) determining that a portion of window 150 that was not obscured by window 152 did not include sufficient area to display information in window 150. Therefore, when event number 2 occurs, there is not enough area in window 150 that is not obscured by window 152 to legibly or intelligibly display either textual information or graphical information contained in window 150. In this situation, the present invention provides a means for locating open or available display space within display 30 and moving and resizing window 150 to occupy such available display space.

In order to implement the window relocation feature of the present invention, the system may monitor the available display space within display 30, and notify the information display software responsible for window 150 that such available display space exists and of the location of such available display space.

Figure 9:
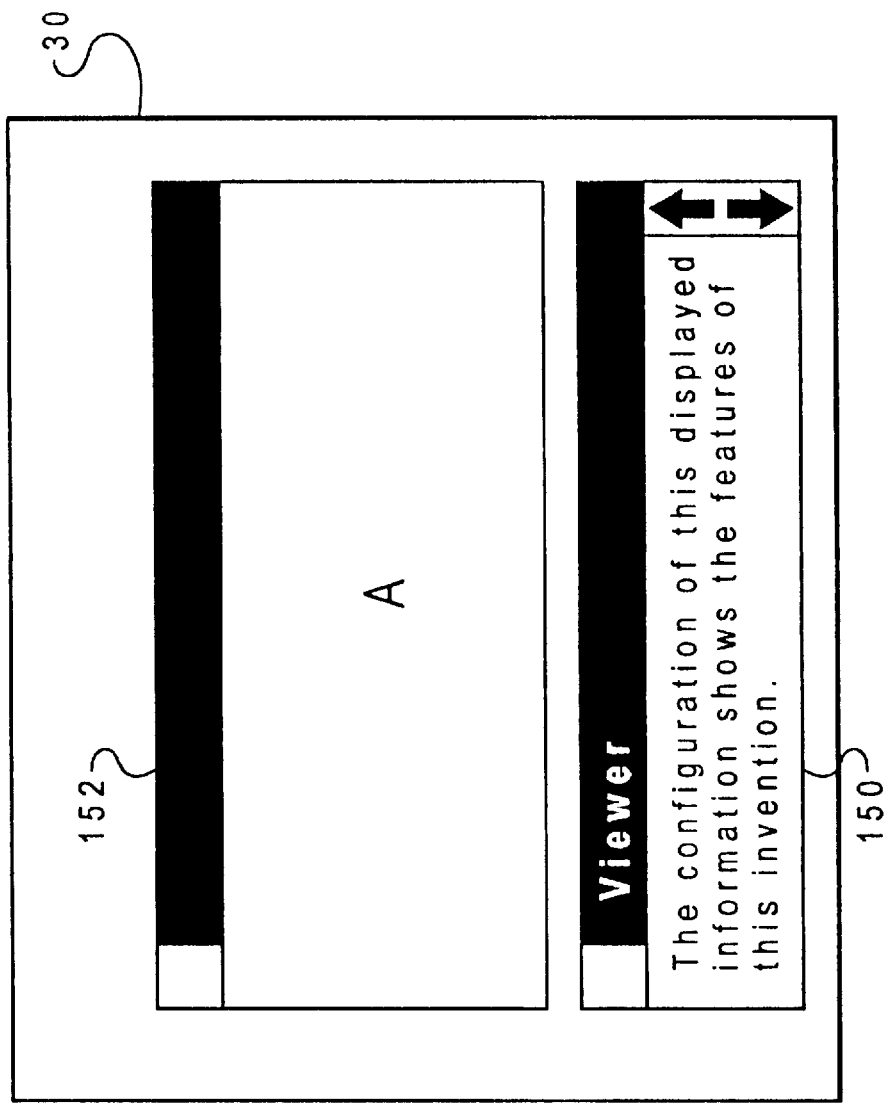
FIG. 9 illustrates another example of a window tiling feature in response to resizing a second window in accordance with the method and system of the present invention.

With reference now to FIG. 9, there is depicted a display having two windows in accordance with a window relocation feature of the method and system of the present invention. As illustrated, window 152 has been enlarged so that it occupies display space previously occupied by window 150 in FIG. 8. In response to such an enlargement of window 152, window 150 has been resized to occupy a smaller remaining space within display 30, and window 150 now includes scroll buttons along the right hand side of the window. Such scroll buttons have been added because all the information in window 150 may not be displayed in the smaller display area now occupied by window 150.

As window 152 is resized to occupy even more display space within display 30, the remaining display space within window 150 may fall below a predetermined minimum amount of display space beyond which the method and system of the present invention will not attempt to display a resized window 150.

Figure 10:
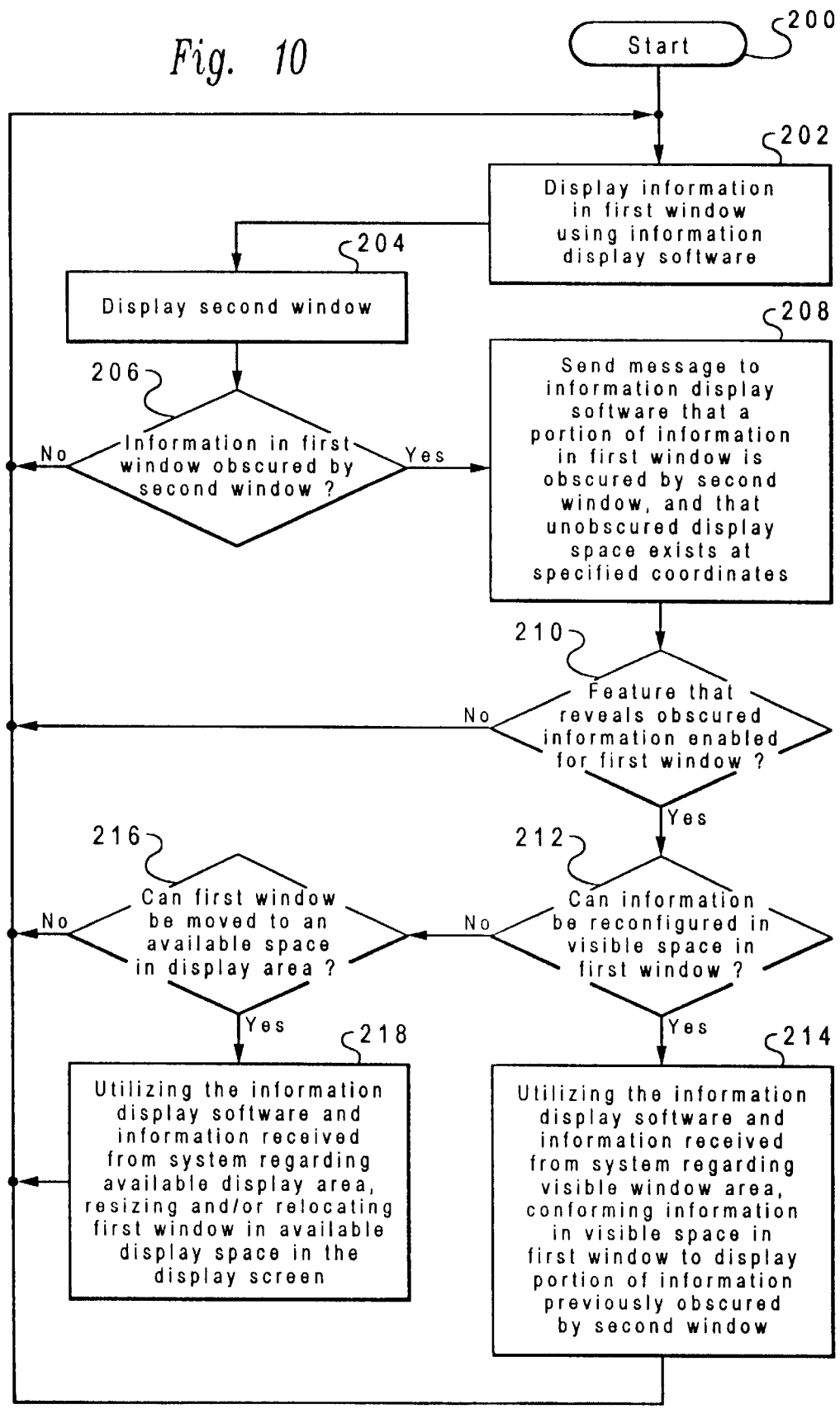
FIG. 10 depicts a high-level flowchart illustrating the process of displaying information in a window in accordance with the method and system of the present invention.

With reference now to FIG. 10, there is depicted a high-level flowchart illustrating the process of displaying information in a window in accordance with the method and system of the present invention. As illustrated, the process begins at block 200, and thereafter passes to block 202 wherein information is displayed in a first window using information display software. Such information display software may include software that allows for wordwrapping of textual information, including the OS/2 help system, the OS/2 system editor, AmiPro, and OpenDoc compound documents. The information displayed in the first window may include textual information, graphical information, or other displayed information such as buttons and controls, video display areas, tool palettes, or the like.

Thereafter, a second window is displayed within the display area of the data processing system, as illustrated at block 204. Next, the process determines whether or not information in the first window is obscured by the second window, as depicted at block 206. Such a determination may be made by a comparison of the boundaries of the first window and the second window by the operating system of the data processing system. If the process determines that information in the first window is not obscured by the second window, the process iteratively loops back to block 202, wherein the first and second windows are displayed according to any new directions given by the computer user to the graphical user interface.

If the process determines that a portion of the information in the first window is obscured by the second window, the process sends a message to the information display software that informs the information display software that a portion of the information displayed in the first window is obscured by the second window, as depicted at block 208. Such a message to the information display software may come from the operating system, or alternatively from the software that displayed the second window that overlays the first window. Additionally, the message to the information display software may contain information that unobscured display space exists at specified coordinates within the display screen.

In other embodiments, the information display software that displayed the first window may perform the detection that the first window has been partially obscured. Such detection may include steps that query the operating system for information regarding the position of other windows that may obscure information in the first window. Additional system queries may request data necessary to determine the location of available display space for an alternative location for the first window.

In yet another embodiment, the information display software may cooperate with other applications that display windows to pass data that notifies the information display software that information in the first window has been obscured. To obtain such cooperation between applications, an area in memory may be shared for describing the location and Z-order of windows displayed by each of the cooperating applications. Thus the cooperating applications are tasked with displaying obscured information without resorting to assistance from the operating system. Such cooperating applications may be written by the same software manufacturer, or they may conform to any industry standard for communicating such window display data.

In still another embodiment, the information display software may display obscured information in the first window when the second, obscuring window is also displayed by the same information display software that displays the first window. In this embodiment, no communication is needed between the information display software and either the operating system or another application—the information display software independently monitors the obstruction of information in windows it is displaying.

Referring again to block 208, once the information display software receives the message that the first window has been obscured by the second window, the process determines whether or not the display feature that reveals obscured information is enabled for the first window, as illustrated at block 210. If the display feature is not enabled, the process may ignore the message from the system that the first window has been obscured, as illustrated by the no branch from block 210. In another embodiment, the display feature that reveals obscured information may inhibit messages from the operating system to the information display software in order to disable the feature. It may be advantageous to have the display feature of the present invention enabled at the operating system level so that any application may take advantage of it. Such an enable and disable control may be treated as a system level control, like the minimize/maximize buttons on a title bar. If, however, the feature that reveals obscured information is enabled, the process determines whether or not information can be reconfigured for display in the visible space in the first window, as depicted at block 212.

If the information in the first window can be reconfigured to be displayed in the visible space of the first window, the information display software conforms information in the first window to display the portion of information previously obscured by the second window, as illustrated block 214. Such conforming of information may utilize functions in the information display software in conjunction with information received from the system regarding visible window area, and may include moving information or resizing information within the first window so that information is not obscured by the second window.

In one embodiment utilizing OpenDoc container parts, an OpenDoc part having dimensions equal to the region of the first window that is overlapped by the second window may be created and embedded in the client area of the first window. This forces the contents of the OpenDoc container to automatically adjust to the newly added part, causing the information in the OpenDoc container to flow around the boundaries of the second window.

Once the information in the first window has been conformed around the second window, the process returns to block 202, wherein information may be reconformed in response to a movement of either the first or second windows, or in response to an enablement or disablement of the display feature of the present invention.

Referring again to decision block 212, if the visible space in the first window falls below a predetermined minimum amount of space so that the information cannot be reconfigured for display in such minimal amount of window space, the process determines whether or not the first window can be moved to an available space in the display area, as illustrated at block 216. If the first window cannot be moved to an available space in the display area, the process iteratively returns to block 202 for detecting any changes in the display of windows in the display screen. If, however, the first window can be moved to an available space in the display area, the information display software utilizes information received from the system regarding available display space to resize and/or relocate the first window in the available display space in the display screen, as depicted at block 218. Thereafter, the process returns to block 202.

While the invention has been described and illustrated above with textual and graphical information, other forms of information displayed within a window may be reconfigured to become visible after being overlapped by another window. These other forms of information may include various buttons or tool palettes or other controls, video display areas, or areas containing aminated graphics. And while the invention has been described and illustrated with reference to only two windows, information displayed in one window may be configured around a plurality of windows. Similarly, a window may be moved or resized to a location that is available in a screen having multiple windows. Moreover, available window space need not be limited to space that does not contain an additional window—available space may include an area of the screen that would overlay other windows that have been placed lower in a Z-order in response to current conditions in the data processing system. In this situation, the process may determine that a window that is being relocated or resized according to the present invention is more important than other windows that may exist further down in the Z-order.

As indicated above, aspects of this invention pertain to specific "method functions" implementable on computer systems. In an alternate embodiment, the invention may be implemented as a computer program product for use with a computer system. Those skilled in the art should readily appreciate that programs defining the functions of the present invention can be delivered to a computer in many forms; including, but not limited to: (a) information permanently stored on non-writable storage media (e.g. read only memory devices within a computer such as ROM 58 or CD-ROM disks 78 readable by a computer I/O attachment); (b) information alterably stored on writable storage media (e.g. floppy disks 74 and hard drives 72); or (c) information conveyed to a computer through communication media such as network 94 and telephone networks via modem 92. It should be understood, therefore, that such media, when carrying computer readable instructions that direct the method functions of the present invention represent alternate embodiments of the present invention.

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principals of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

What is claimed is:

1. A method in a data processing system for displaying information, wherein said data processing system includes a display and an operating system, said method comprising the steps of:

displaying information within a first window in said display utilizing information display software;

detecting a second window displayed within said display at a location which obscures a portion of said information displayed within said first window;

notifying said information display software that said portion of said information displayed within said first window is obscured; and automatically relocating said portion of said information displayed within said first window that had been obscured to an unobscured portion of said first window in response to said notification such that said portion of said information may be visually accessed.

2. The method in a data processing system for displaying information according to claim 1 wherein said step of displaying information within a first window in said display utilizing information display software comprises the step of displaying textual information within said first window in said display utilizing information display software.

3. The method in a data processing system for displaying information according to claim 2 wherein said textual information includes words in a predetermined order, and wherein said step of automatically relocating said portion of said information displayed within said first window that had been obscured to an unobscured portion of said first window in response to said notification comprises the step of automatically relocating said portion of said information displayed within said first window to an unobscured portion of said first window while preserving said predetermined order.

4. The method in a data processing system for displaying information according to claim 1 wherein said data processing system includes an enable/disable input, and wherein said step of automatically relocating said portion of said information displayed within said first window that had been obscured to an unobscured portion of first window in response to said notification comprises automatically relocating said portion of said information displayed within said first window that had been obscured to an unobscured portion of said first window in response to said notification only in response to a state of said enable/disable input.

5. A data processing system for displaying information, wherein said data processing system includes a display and an operating system, said data processing system comprising:

means for displaying information within a first window in said display utilizing information display software;

means for detecting a second window displayed within said display at a location which obscures a portion of said information displayed within said first window;

means for notifying said information display software that said portion of said information displayed within said first window is obscured; and means for automatically relocating said portion of said information displayed within said first window that had been obscured to an unobscured portion of said first window in response to said notification such that said portion of said information may be visually accessed.

6. The data processing system for displaying information according to claim 5, wherein said means for displaying information within a first window in said display utilizing information display software comprises means for displaying textual information within said first window in said display utilizing information display software.

7. The data processing system for displaying information according to claim 6, wherein said textual information includes words in a predetermined order, and wherein said means for automatically relocating said portion of said information displayed within said first window that has been obscured to an unobscured portion of said first window in response to said notification comprises means for automatically relocating said portion of said information displayed within said first window to an unobscured portion of said first window while preserving said predetermined order.

8. A data processing system for displaying information according to claim 5, wherein the data processing system includes an enable/disable input and wherein said means for automatically relocating said portion of said information displayed within said first window that had been obscured to an unobscured portion of said first window in response to said notification comprises means for automatically relocating said portion of said information displayed within said first window that had been obscured to an unobscured portion of said first window in response to said notification and a state of said enable/disable input.

9. A computer program product comprising:

a computer usable medium having computer readable program code and computer readable system code embodied on said medium for displaying information within a data processing system, said computer program product including:

computer readable program code within said computer usable medium for displaying information within a first window in said display utilizing information display software;

computer readable program code within said computer usable medium for detecting a second window displayed within said display at a location which obscures a portion of said information displayed within said first window;

computer readable program code within said computer usable medium for notifying said information display software that said portion of said information displayed within said first window is obscured; and computer readable program code within said computer usable medium for automatically relocating said portion of said information displayed within said first window that had been obscured to an unobscured portion of said first window in response to said notification such that said portion of said information may be visually accessed.

* * * * *